US012618020B2

(12) United States Patent
Sun et al.

(10) Patent No.: US 12,618,020 B2
(45) Date of Patent: May 5, 2026

(54) WATER-SOLUBLE CLEANING AGENT SHEET AND PREPARATION METHOD AND APPLICATION METHOD THEREOF

(71) Applicant: Guangzhou Joyson Cleaning Products Co., Ltd., Guangzhou (CN)

(72) Inventors: Jianfeng Sun, Guangzhou (CN); Fenglei Li, Guangzhou (CN); Min Sun, Guangzhou (CN); Jieting Yan, Guangzhou (CN); Yufeng Chen, Guangzhou (CN)

(73) Assignee: Guangzhou Joyson Cleaning Products Co., Ltd., Guangzhou (CN)

( * ) Notice: Subject to any disclaimer, the term of this patent is extended or adjusted under 35 U.S.C. 154(b) by 303 days.

(21) Appl. No.: 18/403,426

(22) Filed: Jan. 3, 2024

(65) Prior Publication Data

US 2025/0145906 A1 May 8, 2025

Related U.S. Application Data

(63) Continuation of application No. PCT/CN2023/129819, filed on Nov. 4, 2023.

(51) Int. Cl.
*C11D 1/00* (2006.01)
*C11D 1/12* (2006.01)
(Continued)

(52) U.S. Cl.
CPC .............. *C11D 1/123* (2013.01); *C11D 1/667* (2013.01); *C11D 1/883* (2013.01); *C11D 1/945* (2013.01); *C11D 17/065* (2013.01); *C11D 9/225* (2013.01); *C11D 13/24* (2013.01); *C11D 13/26* (2013.01); *C11D 2111/14* (2024.01); *C11D 2111/42* (2024.01)

(58) Field of Classification Search
None
See application file for complete search history.

(56) References Cited

U.S. PATENT DOCUMENTS 5,403,515 A * 4/1995 Instone .................... C11D 1/83 510/495
2005/0003991 A1 1/2005 MacQuarrie
(Continued)

FOREIGN PATENT DOCUMENTS

CN 105733843 A 7/2016
CN 112430510 A 3/2021
(Continued)

OTHER PUBLICATIONS

International Search Report of Corresponding Application No. PCT/CN2023/129819; Dec. 18, 2023; 5 Pgs.
(Continued)

*Primary Examiner* — Necholus Ogden, Jr.
(74) *Attorney, Agent, or Firm* — Cooper Legal Group, LLC

(57) ABSTRACT

A water-soluble cleaning agent sheet includes the following components in parts by weight: 12-35 parts of film-forming agent, 0-3 parts of thickening agent, 0-10 parts of water softener, 15-50 parts of anionic surfactant, 1-10 parts of non-ionic surfactant, 1-10 parts of amphiprotic surfactant, 0-10 parts of solubilizer, 1-10 parts of acrylate polymer; 0-10 parts of plant extract, and 0-1 parts of preservative.

18 Claims, 4 Drawing Sheets

(51) Int. Cl.

| | |
|---|---|
| ***C11D 1/66*** | (2006.01) |
| ***C11D 1/88*** | (2006.01) |
| ***C11D 1/94*** | (2006.01) |
| ***C11D 17/06*** | (2006.01) |
| *C11D 9/22* | (2006.01) |
| *C11D 13/24* | (2006.01) |
| *C11D 13/26* | (2006.01) |

(56) References Cited

U.S. PATENT DOCUMENTS

| | | | |
|---|---|---|---|
| 2007/0099807 | A1 | 5/2007 | Smith |
| 2019/0194584 | A1 | 6/2019 | Astete Boettcher |
| 2020/0277555 | A1 | 9/2020 | Cho et al. |
| 2021/0261885 | A1 | 8/2021 | Tibbs et al. |

FOREIGN PATENT DOCUMENTS

| | | | |
|---|---|---|---|
| CN | 115651781 | A | 1/2023 |
| EP | 3555153 | B1 | 12/2020 |
| WO | 2020210894 | A1 | 10/2020 |
| WO | 2022126232 | A1 | 6/2022 |

OTHER PUBLICATIONS

Light Industry Standard of the People's Republic of China; QB/T 4532-2013; "Hard Floor Cleaner"; Mar. 1, 2014.

Supplementary European Search Report received in corresponding European patent application No. 23825345.4, dated Nov. 11, 2024, 7 pages.

* cited by examiner

WATER-SOLUBLE CLEANING AGENT SHEET AND PREPARATION METHOD AND APPLICATION METHOD THEREOF

CROSS-REFERENCE TO RELATED APPLICATION

This application is a continuation of international PCT application serial no. PCT/CN2023/129819, filed on Nov. 4, 2023. The entirety of international PCT application serial no. PCT/CN2023/129819 is hereby incorporated by reference herein and made a part of this specification.

TECHNICAL FIELD

The present application relates to the technical field of cleaning materials, and in particular, relates to a water-soluble cleaning agent sheet and a preparation method and an application method thereof.

BACKGROUND ART

Currently, the cleaning products in the markets have a diversified development trend, and include various cleaning materials such as liquid cleaning agents and solid concentrated cleaning agents. The cleaning agents in the markets are mainly prepared through compounding surfactants in water matrix. In particular, for the household hard surface, the cleaning agents sprayed for cleaning are mainly provided to the costumers in liquid form.

In order to spray the cleaning agents in spray cans more uniformly and easily, the active ingredients in the cleaning agents generally have low concentration. Therefore, when removing stains that are difficult to be removed, it needs multiple sprays and wiping to clean, thereby greatly extending the cleaning period.

In addition, when the cleaning agents are sprayed through the spray can, the sprayed foam of cleaning agents are sparse due to low concentration of active substances, quickly spread or slip off from the stains, and are difficult to stay on the stains. In particular, the stains on vertical surfaces such as walls, bathrooms, car bodies and glass are difficult to fully contact with the cleaning agents, so that the decontamination effect is greatly reduced.

Furthermore, most liquid cleaning agent products have a risk of leakage in transportation. Moreover, transporting a large amount water matrix will generate unnecessary waste and increase the cost.

In summary, there is room for improvement.

SUMMARY

In order to overcome above deficiencies, the present application provides a water-soluble cleaning agent sheet and a preparation method and an application method thereof. By using the cleaning agent sheet provided in the present application, the cleaning agent solution can be evenly and easily sprayed out and abundant foam can be generated. The generated foam contact with stains for a long period, so a good decontamination effect is achieved, and cleaning agent sheet is easy to be transported.

In a first aspect, the present application provides a water-soluble cleaning agent sheet, adopting the following technical solution:

a water-soluble cleaning agent sheet includes the following components in parts by weight: 12-35 parts of film-forming agent, 0-3 parts of thickening agent, 0-10 parts of water softener, 15-50 parts of anionic surfactant, 1-10 parts of non-ionic surfactant, 1-10 parts of amphiprotic surfactant, 0-10 parts of solubilizer, 1-10 parts of acrylate polymer; 0-10 parts of plant extract, and 0-1 parts of preservative;

the anionic surfactant is one or more selected from the group consisting of alpha-olefin sulfonate, dodecylbenzene sulfonate, disodium-C-(2-cocoylethyl) ester sulfo succinate, and dodecyl sulfate;

the non-ionic surfactant is one or more selected from the group consisting of alkyl glycoside, maltoside, coconut oil fatty acid diethanolamide, and cocamide methyl MEA; and the amphiprotic surfactant is one or more selected from the group consisting of N-(2-Aminoethyl)-N-(2-hydroxyethyl)-β-alanine-N-coconut oil derivative monosodium salt, cocoylaminopropyl betaine, dodecyldimethylamine oxide, disodium cocoyl amphoteric diacetate, and coconut fatty acid imidazoline dipropionate sodium salt.

The prepared product has a good emulsification effect on stains and can generate abundant viscous foam by defining the reasonable ratio between the specific surfactants that are not ethoxylated. In a specific formulated system of the surfactants, the acrylate polymer that is suitable for the aqueous solution is used, such that the product has good viscosity when the product is sprayed. A "spraying and adhesion" technology is innovatively introduced into the formulation. The contact period between the product and the stains can be effectively increased when the product is used, thereby enhancing the decontamination effect, which is especially important for cleaning vertical surfaces. In addition, when the product is sprayed via a spray can, the aqueous solution of cleaning agent has good shear resistance, so that the aqueous solution including ingredients with washing effect can form thick and dense foam, to be adhered on the stains better. The contact period with the stains is increased, further extending the period of adsorption, wetting and emulsification to stains.

The products in the present application are sheets, which can be directly used after being diluted with the water when cleaning is needed. The products have good decontamination effect during cleaning, and the normal stains can be cleaned only through simple and gentle rinsing, which is easy to be used and has strong decontamination ability, thereby removing stains easily and reducing cleaning period. The products, not including ethoxylated components, can effectively avoid the production of harmful components such as 1,4-dioxan during being used.

In an embodiment, the anionic surfactant is a mixture of dodecyl sulfate, alpha-olefin sulfonate, and disodium-C-(2-cocoylethyl) ester sulfo succinate;

the non-ionic surfactant is a mixture of alkyl glycoside and cocamide methyl MEA (coconut acid methyl monoethanolamide); and the amphiprotic surfactant is a mixture of N-(2-Aminoethyl)-N-(2-hydroxyethyl)-β-alanine-N-coconut oil derivative monosodium salt, disodium cocoyl amphoteric diacetate, and coconut fatty acid imidazoline dipropionate sodium salt.

In the above technical solution, abundant foam can be generated by formulating specific anionic surfactants, non-ionic surfactant and amphiprotic surfactants. By the specific cooperation between the surfactants and acrylate polymer, the aqueous solution of the product has good shear resistance when in use, so that the cleaning agent aqueous solution can be sprayed uniformly on the stains as viscous foam, and is not easy to slip off immediately, thereby increasing the contact period with the stains, extending the performances of the adsorption, wetting, and emulsification to stains, and improving detergency to stains. In addition, the cleaning agent can be directionally and controllably sprayed and thickened as mist spray on the stains in a small area, so that other areas without stains cannot be affected, the cleaning period can be greatly reduced and it is convenient and practical.

In an embodiment, in the anionic surfactant, a mass ratio of the dodecyl sulfate, alpha-olefin sulfonate, and disodium-C-(2-cocoylethyl) ester sulfo succinate is (20-30):(3-8):(1-3);

in the non-ionic surfactant, a mass ratio of the alkyl glycoside to cocamide methyl MEA is (1-3):(2-5); and in the amphiprotic surfactant, a mass ratio of the N-(2-Aminoethyl)-N-(2-hydroxyethyl)-β-alanine-N-coconut oil derivative monosodium salt, disodium cocoyl amphoteric diacetate, and coconut fatty acid imidazoline dipropionate sodium salt is (1-3):(1-3):(0.1-2).

In the above technical solution, the abundant and delicate foam can be generated by further defining the amounts of the various surfactants, and can fully contract with stains. The abundant and delicate foam can be quickly and uniformly spread on the area to be cleaned to form a thin layer of viscous foam, which is conductive to further extend the retention time of foam on the area to be cleaned, thereby improving the detergency.

In an embodiment, the acrylate polymer is 2-6 parts in parts by weight.

In the above technical solution, by defining the amounts of the various surfactants and the amount of the acrylate polymer, the generated abundant foam has certain viscosity, and is not too dense and can be sprayed at the designated area. The foam also have suitable contact period with stains and the stains are easy to be cleaned.

In an embodiment, the film-forming agent is one or more selected from the group consisting of polyvinyl alcohol and polyvinyl alcohol crosspolymer.

In an embodiment, a mass ratio of the film-forming agent to the thickening agent is (20-26):(0.5-1.5).

The sheet is prepared by mixing the water-soluble polyvinyl alcohol and polyvinyl alcohol crosspolymer both with different molecular weights with the thickening agent in a specific ratio, which has multi-effects such as protecting the colloid in the system, swelling when being dissolved in water, and promoting dissolution.

The water-soluble cleaning agent sheet may be packaged without plastics, and can be quickly and fully dissolved in the water.

In an embodiment, the thickening agent is one or more selected from the group consisting of water-soluble polymer adhesive and cellulose.

In an embodiment, the water-soluble polymer adhesive is one or more selected from the group consisting of xanthan gum, Arabic gum, guar gum, and locust bean gum. The cellulose is one or more selected from the group consisting of carboxymethyl cellulose, hydroxypropyl methyl cellulose, hydroxyethyl cellulose, and polyanionic cellulose.

The cooperation between the above thickening agent and the acrylate polymer can further enhance the viscosity of the foam formed by spraying, and the viscosity thereof is more stable and long-lasting.

It is noted that, although a thickening agent is used in the present application, after cleaning agent sheet is diluted by the water, the aqueous solution of the cleaning agent has a low viscosity, which does not affect the spraying. However, only after the aqueous solution of the cleaning agent in the present application is finally sprayed, the foam with high viscosity is formed.

In an embodiment, the solubilizer is one or more selected from the group consisting of alcohol solubilizer, and ether solubilizer.

In an embodiment, the alcohol solubilizer is one or more selected from the group consisting of ethanol, ethylene glycol, glycerol, propylene glycol, dipropylene glycol, isopropanol, pentanediol, butanediol, and isohexanediol. The ether solubilizer is one or more selected from the group consisting of ether, n-ether, dimethyl ether, ethylene glycol ether, and dipropylene glycol ether.

In an embodiment, the solubilizer is a mixture of isohexanediol and dipropylene glycol ether with a mass ratio of 5:(1-5).

In the above technical solution, selecting the solubilizer with specific types and proportions facilitates removing stains better.

In an embodiment, the plant extract is one or more selected from the group consisting of soapberry extract and *Camellia oleifera* Abel extract.

In an embodiment, the plant extract is a mixture of soapberry extract and *Camellia oleifera* Abel extract with a mass ratio of 1:(0.8-1.2).

In the above technical solution, mixing suitable amount of specific plant extract facilitates further improving foam performance, reducing the irritancy of the formula system and the corrosion performance on surfaces to be cleaned, and extending the service life of home furnishings.

In an embodiment, the water softener is a mixture of sodium citrate and one or more selected from the group consisting of trisodium methylglycine diacetate, tetrasodium ethylenediaminetetraacetate, sodium gluconate, dicarboxymethylalanine trisodium, and dicarboxymethylaspartate tetrasodium.

In the above technical solution, selecting specific water softener facilitates the softening effect to daily tap water (hard water). Besides, the cooperation between the sodium citrate and other water softeners can facilitate the dissolution of the sheets when in use. The sodium citrate as the water softener is safety, and environmental friendly.

In an embodiment, the preservative is high-temperature resistant preservative, and the preservative is one or more selected from the group consisting of hydroxydichlorodiphenyl ether, dichlorobenzyl alcohol, methyl hydroxybenzoate, and hydroxyphenyl acetate.

In a second aspect, the present application provides a preparation method for the water-soluble cleaning agent sheet, adopting the following technical solution:

a preparation method for the water-soluble cleaning agent sheet includes the following steps: mixing various raw materials and water uniformly, and drying and slicing to obtain sheets.

In the above technical solution, the cleaning agent is produced into the sheet, which need not be transported with water, thereby improving the security and stability and reducing costs.

In an embodiment, a preparation method for the water-soluble cleaning agent sheet includes the following steps:

mixing water and the thickening agent, in which the mass of water is 2-3 times of the film-forming agent, heating to 50-60° C., adding the film-forming agent under stirring and heating to 80-90° C. until the thickening agent and the film-forming agent are totally dissolved;

- adding the water softener, the anionic surfactant, the non-ionic surfactant, the amphiprotic surfactant and the solubilizer under stirring until dissolved uniformly to obtain a mixture;
- pre-mixing the acrylate polymer and water to obtain a acrylate polymer solution, adding the acrylate polymer solution into the mixture under stirring until dissolved uniformly; and a mass ratio of the acrylate polymer to water is 1:(1-3);
- adding the plant extract and the preservative under stirring until dissolved uniformly to obtain a slurry; and
- drying the slurry, demoulding and slicing to obtain the sheet.

In a third aspect, the present application provides an application method for the water-soluble cleaning agent sheet, adopting the following technical solution:

- an application method for the water-soluble cleaning agent sheet includes the following steps: dissolving the sheet in water in a ratio of 1:(100-1000), adding the solution into a pressure spray can, and spraying the solution on stains for cleaning.

After the sheet and water are mixed, a liquid having a certain flowability is formed. The cleaning agent solution instantaneously becomes dense, thick and fine foam at the moment of being sprayed from the pressure spray can, due to the action of force, and the foam is adhered on the surface of the area to be cleaned, thereby increasing the contact period with stains, extending the adsorption, wetting, and emulsification time of stains, and improving the decontamination effect.

In summary, the present application can achieve the following beneficial effects:

1. the prepared product has a good emulsification effect on stains and can generate abundant viscous foam by defining the reasonable ratio between the specific surfactants that are not ethoxylated. In a specific formulated system of the surfactants, the acrylate polymer that is suitable for the aqueous solution is used, such that the product has good viscosity when the product is sprayed. A "spraying and adhesion" technology is innovatively introduced into the formulation. The contact period between the product and the stains can be effectively increased when the product is used, thereby enhancing the decontamination effect, which is especially important for cleaning vertical surfaces. In addition, when the product is sprayed via a spray can, the aqueous solution of cleaning agent has good shear resistance, so that the aqueous solution including ingredients with washing effect can form thick and dense foam, to be adhered on the stains better. The contact period with the stains is increased, further extending the period of adsorption, wetting and emulsification to stains;
2. the water-soluble cleaning agent sheet may be packaged without plastics, and can be quickly and fully dissolved in the water. The products can be prepared as solid sheet with any sizes. After the product is diluted with water in a certain ratio, it can be used for cleaning the stains (it also can be used on vertical surfaces), which is convenient, useful, easy to transport and store, and suitable for large-scale production; and
3. the products, not including ethoxylated component substances, can effectively avoid the production of harmful components such as 1,4-dioxan during being used. The products further improve foam performance, reduce the irritancy of the formula system and the corrosion performance on surfaces to be cleaned, and extend the service life of home furnishings.

DETAILED DESCRIPTION

Figure 1:
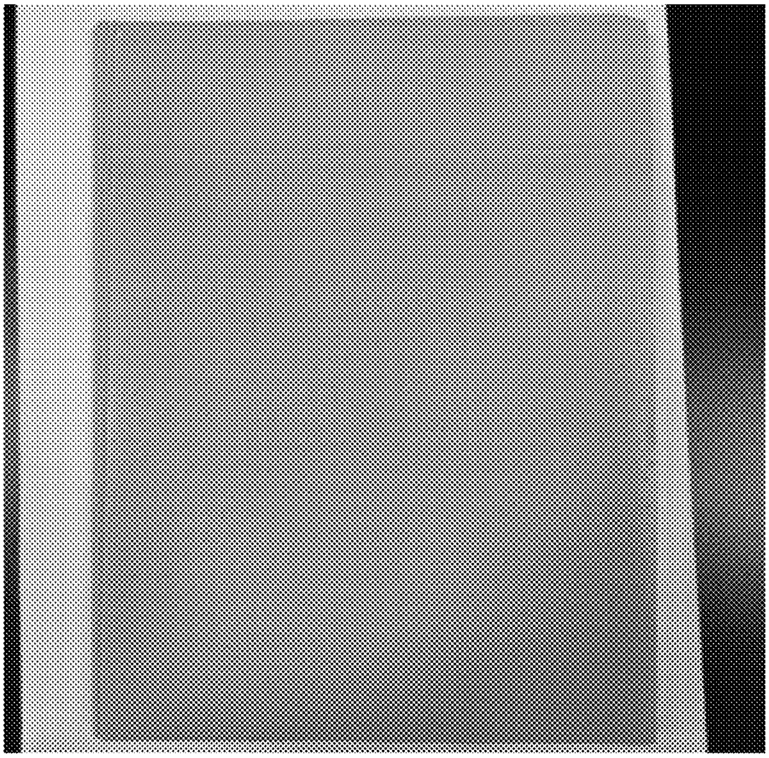
FIG. 1 is a picture of a water-soluble cleaning agent sheet according to Example 3 of the present application.

The present application will be further described in detail below in combination with the accompanying drawings.

All the raw materials in examples and comparative examples are commercially available.

EXAMPLES

In the examples and comparative examples:

the film-forming agent was polyvinyl alcohol and/or polyvinyl alcohol crosspolymer.

The thickening agent was xanthan gum, Arabic gum, hydroxyethyl cellulose, hydroxypropyl methyl cellulose or polyanionic cellulose.

The water softener was trisodium methylglycine diacetate, sodium citrate, tetrasodium ethylenediaminetetraacetate, sodium gluconate, or dicarboxymethylalanine trisodium.

The anionic surfactant was sodium dodecyl sulfate, sodium potassium dodecyl sulfate, sodium alpha-olefin sulfonate, potassium alpha-olefin sulfonate, sodium dodecyl benzene sulfonate, potassium dodecyl benzene sulfonate, or disodium-C-(2-cocoylethyl) ester sulfo succinate.

The disodium-C-(2-cocoylethyl) ester sulfo succinate was purchased from Evonik Germany with an article No. of TEGOTENS ES 501.

The non-ionic surfactant was alkyl glycoside, coconut oil fatty acid diethanolamide, or cocamide methyl MEA.

The amphiprotic surfactant was N-(2-Aminoethyl)-N-(2-hydroxyethyl)-β-alanine-N-coconut oil derivative monosodium salt, cocoylaminopropyl betaine, dodecyldimethylamine oxide, disodium cocoyl amphoteric diacetate, or coconut fatty acid imidazoline dipropionate sodium salt.

N-(2-Aminoethyl)-N-(2-hydroxyethyl)-β-alanine-N-coconut oil derivative monosodium salt was purchased from Evonik Germany with an article No. of REWOTERIC AM KSF 40.

The solubilizer was glycerol, propylene glycol, isohexanediol, dipropylene glycol butyl ether, dipropylene glycol, or pentanediol.

The acrylate polymer was acrylate polymer CrystaSense Sapphire or acrylic acid (ester) VA copolymer SF-1.

The plant extract was soapberry extract or *Camellia oleifera* Abel extract.

The preservative was hydroxydichlorodiphenyl ether, or dichlorobenzyl alcohol.

The selection and additive amount of the specific raw materials in the examples were shown in table 1.

Example 1

A water-soluble cleaning agent sheet included the following raw materials: film-forming agent, thickening agent, water softener, anionic surfactant, non-ionic surfactant, amphiprotic surfactant, solubilizer, acrylate polymer; plant extract, and preservative.

The selection and additive amount of the specific raw materials were shown in table 1.

The present application further provided a preparation method for the water-soluble cleaning agent sheet, adopting the following technical solution:

step (1), the water was weighted, and the weight of the water was 2 times of the film-forming agent; the water and the thickening agent were added into an emulsifying pot, mixed and dissolved uniformly, and heated to 55° C.; the film-forming agent was added under uniform stirring, stirred and heated to 85° C. until the materials were totally dissolved, and the heating was stopped;

step (2), the water softener, the anionic surfactant, the non-ionic surfactant, the amphiprotic surfactant and the solubilizer were added into the emulsifying pot under stirring until the materials were dissolved uniformly to obtain a mixture;

step (3), the water was weighted, the weight of the water was 2 times of the acrylate polymer, and the water and acrylate polymer are mixed under uniform stirring to obtain an acrylate polymer solution;

the acrylate polymer solution was added into the emulsifying pot under stirring and dissolved uniformly;

step (4), the plant extract and the preservative were added into the emulsifying pot under stirring until dissolved uniformly to obtain a stable slurry;

step (5), the prepared slurry was transported to a drying device through tubes and dried; and step (6), molding, demoulding and slicing were performed to obtain the water-soluble cleaning agent sheet shown as FIG. 1.

This example further provides an application method for the water-soluble cleaning agent sheet, including the following steps: diluting the sheet in water in a ratio of 1:(100-1000) to obtain a solution, adding the solution into a pressure spray can, and spraying the solution on stains for cleaning.

Examples 2-8

The water-soluble cleaning agent sheets of Examples 2-8 were same as example 1 expect that, the selection and additive amounts of the raw materials were different, as shown in table 1.

TABLE 1

| | | Examples (kg) | | | | | | | |
|---|---|---|---|---|---|---|---|---|---|
| Material types | Materials | 1 | 2 | 3 | 4 | 5 | 6 | 7 | 8 |
| Film-forming agent | PVA-BP05 | 8 | 20 | 20 | 20 | 30 | 20 | 20 | 20 |
| | PVA-BP17 | 4 | 5 | 5 | 5 | / | 5 | 5 | 5 |
| | PVA-BP24 | / | / | / | / | 5 | / | / | / |
| Thickening agent | Xanthan gum | 0.1 | / | / | / | / | / | / | / |
| | Arabic gum | 0.1 | / | / | / | / | / | / | / |
| | Hydroxyethyl cellulose | / | / | 1 | 1 | 2 | 1 | 1 | 1 |
| | Hydroxypropyl methyl cellulose | 0.1 | / | / | / | / | / | / | / |
| | Polyanionic cellulose | / | / | / | / | 1 | / | / | / |
| Water softener | Trisodium methylglycine diacetate | / | 2 | 2 | 2 | 2 | 2 | 2 | 2 |
| | Sodium citrate | / | 2 | 2 | 2 | 3 | 2 | 2 | 2 |
| | Tetrasodium ethylenediaminetetraacetate | / | 1 | 1 | 1 | 3 | 1 | 1 | 1 |
| | Sodium gluconate | / | / | / | / | 2 | / | / | / |
| | Dicarboxymethylalanine trisodium | / | 1 | 1 | 1 | 2 | 1 | 1 | 1 |
| Anionic surfactant | Sodium dodecyl sulfate | 10 | 25 | 25 | 25 | 30 | 20 | 30 | 16 |
| | Sodium alpha-olefin sulfonate | 5 | 5 | 5 | / | 5 | 3 | 8 | 10 |
| | Sodium dodecyl benzene sulfonate | / | 2 | / | 5 | 5 | / | / | / |
| | Disodium-C-(2-cocoylethyl) ester sulfo succinate | / | / | 2 | 2 | 5 | 1 | 3 | 6 |
| Non-ionic surfactant | Alkyl glycoside | 0.5 | 2 | 2 | 3 | 5 | 1 | 3 | 4 |
| | Coconut oil fatty acid diethanolamide | 0.5 | 3 | / | 2 | 5 | / | / | / |
| | Cocamide methyl MEA | / | / | 3 | / | / | 2 | 5 | 1 |
| Amphiprotic surfactant | Cocoylaminopropyl betaine | 0.5 | / | / | 2 | 4 | / | / | / |
| | Dodecyldimethylamine oxide | / | 4 | / | / | 1 | / | / | / |
| | Disodium cocoyl amphoteric diacetate | / | / | 2 | / | 2 | 1 | 3 | 0.1 |
| | Coconut fatty acid imidazoline dipropionate sodium salt | / | / | 1 | 1 | 1 | 0.1 | 2 | 4.8 |

TABLE 1-continued

| Material types | Materials | Examples (kg) 1 | 2 | 3 | 4 | 5 | 6 | 7 | 8 |
|---|---|---|---|---|---|---|---|---|---|
| | N-(2-Aminoethyl)-N-(2-hydroxyethyl)-β-alanine-N-coconut oil derivative monosodium salt | 0.5 | 1 | 2 | 2 | 2 | 1 | 3 | 0.1 |
| Solubilizer | Glycerol | 0.5 | 1 | 0.1 | 1 | 2 | 1 | 1 | 1 |
| | Propylene glycol | / | / | / | / | 2 | / | / | / |
| | Isohexanediol | 2 | 2 | 0.4 | 2 | 3 | 2 | 2 | 2 |
| | Dipropylene glycol butyl ether | 0.5 | 2 | 0.4 | 2 | 3 | 2 | 2 | 2 |
| | Dipropylene glycol | 0.5 | / | / | / | / | / | / | / |
| | Pentanediol | / | 1 | 0.1 | 1 | / | 1 | 1 | 1 |
| Acrylate polymer | Acrylate polymer CrystaSense Sapphire | 1 | 3 | 3 | 3 | 5 | 1.5 | 4.5 | 3 |
| | Acrylic acid (ester) VA copolymer SF-1 | / | 1 | 1 | 1 | 5 | 0.5 | 1.5 | 1 |
| Plant extract | Soapberry extract | 0.5 | / | 2 | 2 | 5 | 2 | 2 | 2 |
| | Amellia oleifera extract | 0.5 | / | 2 | 2 | 5 | 2 | 2 | 2 |
| Preservative | Hydroxydichlorodiphenyl ether | 0.05 | / | 0.1 | 0.1 | 0.5 | 0.1 | 0.1 | 0.1 |
| | Dichlorobenzyl alcohol | 0.05 | / | / | / | 0.5 | / | / | / |

COMPARATIVE EXAMPLES

Comparative Example 1

The water-soluble cleaning agent sheet in Comparative example 1 was same as that of Example 3 expect that: the non-ionic surfactant, the amphiprotic surfactant and the acrylate polymer were replaced by water.

In particular, the amounts of the non-ionic surfactant, the amphiprotic surfactant and the acrylate polymer were 0.

The anionic surfactant was a mixture of 25 kg of sodium dodecyl sulfate, 5 kg of sodium alpha-olefin sulfonate and 2 kg of sodium dodecyl benzene sulfonate.

Comparative Example 2

The water-soluble cleaning agent sheet in Comparative example 2 was same as that of Example 3 expect that: the non-ionic surfactant and the amphiprotic surfactant were replaced by water.

In particular, the amounts of the non-ionic surfactant and the amphiprotic surfactant were 0.

The anionic surfactant was a mixture of 25 kg of sodium dodecyl sulfate, 5 kg of sodium alpha-olefin sulfonate and 2 kg of sodium dodecyl benzene sulfonate.

Comparative Example 3

The water-soluble cleaning agent sheet in Comparative example 3 was same as that of Example 3 expect that: the non-ionic surfactant and acrylate polymer were replaced by water.

In particular, the amounts of the non-ionic surfactant and the acrylate polymer were 0.

The anionic surfactant was a mixture of 25 kg of sodium dodecyl sulfate, 5 kg of sodium alpha-olefin sulfonate and 2 kg of sodium dodecyl benzene sulfonate.

The amphiprotic surfactant was 2 kg of disodium cocoyl amphoteric diacetate, 1 kg of coconut fatty acid imidazoline dipropionate sodium salt, and 2 kg of N-(2-Aminoethyl)-N-(2-hydroxyethyl)-β-alanine-N-coconut oil derivative monosodium salt.

Comparative Example 4

The water-soluble cleaning agent sheet in Comparative example 3 was same as that of Example 3 expect that: the non-ionic surfactant was replaced by water.

In particular, the amount of the non-ionic surfactant was 0.

The anionic surfactant was a mixture of 25 kg of sodium dodecyl sulfate, 5 kg of sodium alpha-olefin sulfonate and 2 kg of sodium dodecyl benzene sulfonate.

The amphiprotic surfactant was 2 kg of disodium cocoyl amphoteric diacetate, 1 kg of coconut fatty acid imidazoline dipropionate sodium salt, and 2 kg of N-(2-Aminoethyl)-N-(2-hydroxyethyl)-β-alanine-N-coconut oil derivative monosodium salt.

Comparative Example 5

The water-soluble cleaning agent sheet in Comparative example 5 was same as that of Example 3 expect that: the amphiprotic surfactant and the acrylate polymer were replaced by water.

In particular, the amounts of the amphiprotic surfactant and the acrylate polymer were 0.

The anionic surfactant was a mixture of 25 kg of sodium dodecyl sulfate, 5 kg of sodium alpha-olefin sulfonate and 2 kg of sodium dodecyl benzene sulfonate.

The non-ionic surfactant was the mixture of 2 kg of alkyl glycoside and 3 kg of cocamide methyl MEA.

Comparative Example 6

The water-soluble cleaning agent sheet in Comparative example 6 was same as that of Example 3 expect that: the amphiprotic surfactant was replaced by water.

In particular, the amount of the amphiprotic surfactant was 0.

The anionic surfactant was a mixture of 25 kg of sodium dodecyl sulfate, 5 kg of sodium alpha-olefin sulfonate and 2 kg of sodium dodecyl benzene sulfonate.

The non-ionic surfactant was the mixture of 2 kg of alkyl glycoside and 3 kg of cocamide methyl MEA.

Comparative Example 7

The water-soluble cleaning agent sheet in Comparative example 7 was same as that of Example 3 expect that:

the anionic surfactant was a mixture of 25 kg of sodium fatty alcoholpolyoxyethylene ether sulfate, 5 kg of sodium methyl fatty alcohol sulfonate and 2 kg of sodium fatty acid methyl ester ethoxylates sulfonate.

the non-ionic surfactant was a mixture of 2 kg of fatty alcohol polyoxyethylene ether and 1 kg of isomerized alcohol alkoxylates.

The amphiprotic surfactant was a mixture of 2 kg of dodecyl dimethyl betaine, 1 kg of sodium lauroyl amphoteric acetate, and 2 kg of cocamidopropyl dimethyl betaine.

Performance Test

1. Decontamination effect: the detergency of the sheets of Examples 1-8 and Comparative examples 1-7 were tested in accordance with "the appendix A of detergency tests in QB/T 4532-2013 of Hard floor cleaner", and the detergency (%) were recorded in table 2.

The larger the tested detergency, the better the decontamination effect, or else, the worse. When the detergency was greater than or equal to 90%, the sheet was qualified, or else, unqualified.

TABLE 2

| Groups | Decontamination effect test Detergency ( %) |
|---|---|
| Example 1 | 94.9 |
| Example 2 | 95.2 |
| Example 3 | 99.6 |
| Example 4 | 96.7 |
| Example 5 | 97.6 |
| Example 6 | 98.8 |
| Example 7 | 99.3 |
| Example 8 | 97.1 |
| Comparative example 1 | 85.5 |
| Comparative example 2 | 88.1 |

TABLE 2-continued

| Groups | Decontamination effect test Detergency ( %) |
|---|---|
| Comparative example 3 | 86.9 |
| Comparative example 4 | 89.6 |
| Comparative example 5 | 87.8 |
| Comparative example 6 | 89.4 |
| Comparative example 7 | 94.2 |

Comparing the test data of Examples 1-8 and Comparative examples 1-7 in table 2, it can be seen that, the detergency of the sheets of Examples 1-8 were obviously better than that of Comparative examples 1-7.

2. Performance Test of Foam

Test 1):

15 of 25 mL glass cups with the same size were prepared.

Each of the sheets of Examples 1-8 and Comparative examples 1-7 was mixed with water in a ratio of 1:500 to obtain the solution, which was sprayed in a 25 mL clean glass cup by a foaming bottle. The foam is sprayed until at the 25 mL scale line of the glass cup, and the excess foam on the surface was scraped off.

The glass cups filled with foam were placed on the test-bed for 5 min and 10 min, and the changes of the foam in each glass cup were observed and recorded in table 3.

Test 2):

Each of the sheets of Examples 1-8 and Comparative examples 1-7 was mixed with water in a ratio of 1:500 to obtain the solution, which was sprayed on the surfaces of the clean and vertical glass by a pressure spray can.

An area of 100 cm×100 cm were drawn on the surface of the vertical glass, and a 4 cm horizontal line was drawn below the area. The foam was sprayed towards the center of the area at about 12 cm from the center of the area, and the sprayed amount was one pump (5-6 g). The time required for the foam sliding below the horizontal line from the area was recorded in table 3. A long time required represents a good retention effect, and a short time required represents a bad retention effect.

TABLE 3

| Groups | Foam amount (5 min) | Foam shape (5 min) | Foam amount (10 min) | Foam shape (10 min) | Retention time of foam (s) |
|---|---|---|---|---|---|
| Example 1 | The foam was dense, and the foam slided down to 23 mL scale line | The foam was thick, dense and fine | The foam was dense, and the foam slided down to 22 mL scale line | The foam was still thick and dense | 1.72 |
| Example 2 | The foam was dense, and the foam slided down to 23 mL scale line | The foam was thick, dense and fine | The foam was dense, and the foam slided down to 21 mL scale line | The foam was still thick and dense | 2.10 |
| Example 3 | The foam was dense, and the foam slided down to 24.5 mL scale line, and had no significant changes | The foam was thick, dense and fine | The foam was dense, and the foam slided down to 24 mL scale line | The foam was still thick and dense | 3.35 |
| Example 4 | The foam was dense, and the foam slided down to 23 mL scale line | The foam was thick, dense and fine | The foam was dense, and the foam slided down to 21 mL scale line | The foam was still thick and dense | 2.36 |
| Example 5 | The foam was dense, and the foam slided down to 23 mL scale line | The foam was thick, dense and fine | The foam was dense, and the foam slided down to 20 mL scale line | The foam was still thick and dense | 1.45 |
| Example 6 | The foam was dense, and the foam slided down to 24 mL scale line | The foam was thick, dense and fine | The foam was dense, and the foam slided down to 23 mL scale line | The foam was still thick and dense | 3.30 |

TABLE 3-continued

| Groups | Foam amount (5 min) | Foam shape (5 min) | Foam amount (10 min) | Foam shape (10 min) | Retention time of foam (s) |
|---|---|---|---|---|---|
| Example 7 | The foam was dense, and the foam slided down to 24 mL scale line | The foam was thick, dense and fine | The foam was dense, and the foam slided down to 22.5 mL scale line | The foam was still thick and dense | 3.48 |
| Example 8 | The foam was dense, and the foam slided down to 22 mL scale line | The foam was thick, dense and fine | The foam was dense, and the foam slided down to 21 mL scale line | The foam was still thick and dense | 2.79 |
| Comparative example 1 | The foam was sparse, and the foam slided down to 15 mL scale line | The foam was sparse and porous | The foam was sparse, and the foam slided down to 10.5 mL scale line | The foam was sparse, porous and transparent | 0.22 |
| Comparative example 2 | The foam was sparse, and the foam slided down to 17 mL scale line | The foam was sparse and porous | The foam was sparse, and the foam slided down to 12 mL scale line | The foam was sparse, porous and transparent | 0.41 |
| Comparative example 3 | The foam was sparse, and the foam slided down to 16 mL scale line | The foam was sparse and porous | The foam was sparse, and the foam slided down to 11 mL scale line | The foam was sparse, porous and transparent | 0.30 |
| Comparative example 4 | The foam was sparse, and the foam slided down to 17.5 mL scale line | The foam was sparse and porous | The foam was sparse, and the foam slided down to 14 mL scale line | The foam was sparse, porous and transparent | 0.58 |
| Comparative example 5 | The foam was sparse, and the foam slided down to 17 mL scale line | The foam was sparse and porous | The foam was sparse, and the foam slided down to 11.5 mL scale line | The foam was sparse, porous and transparent | 0.34 |
| Comparative example 6 | The foam was sparse, and the foam slided down to 18 mL scale line | The foam was sparse and porous | The foam was sparse, and the foam slided down to 13 mL scale line | The foam was sparse, porous and transparent | 0.50 |
| Comparative example 7 | The foam was sparse, and the foam slided down to 20 mL scale line | The foam was rather sparse and porous | The foam was sparse, and the foam slided down to 15 mL scale line | The foam was sparse, porous and transparent | 0.62 |

From the test data in table 3, it can be seen that, the foam amount of the water-soluble cleaning agent sheets in Examples 1-8 of the present application was far greater than that of Comparative examples 1-7 after standing for 5 min and 10 min, and the foam shapes had almost no change, and were still dense, compared with the Comparative examples 1-7.

Comparing the test data of Examples 1-8 and Comparative examples 1-7 in tables 2-3, it can be seen that, the decontamination effects of the sheets of Comparative examples 1-7 were not as good as that of the sheets of Examples 1-8, further the shapes, amounts and retention times of foam of Comparative examples 1-7 were also not as good as that of the sheets of Examples 1-8. It is indicated that changing the cooperation system or components in the formula in Comparative examples 1-7 disrupted specific cooperation effects, therefore, the abundant foam long-lastingly adhered on the area to be cleaned (especially, the vertical area to be cleaned) cannot be generated.

Figure 2:
FIG. 2 is a picture of the state during the test 2) in Example 3 of the present application, and a test result figure of the aqueous solution of Sample 2.
Figure 3:
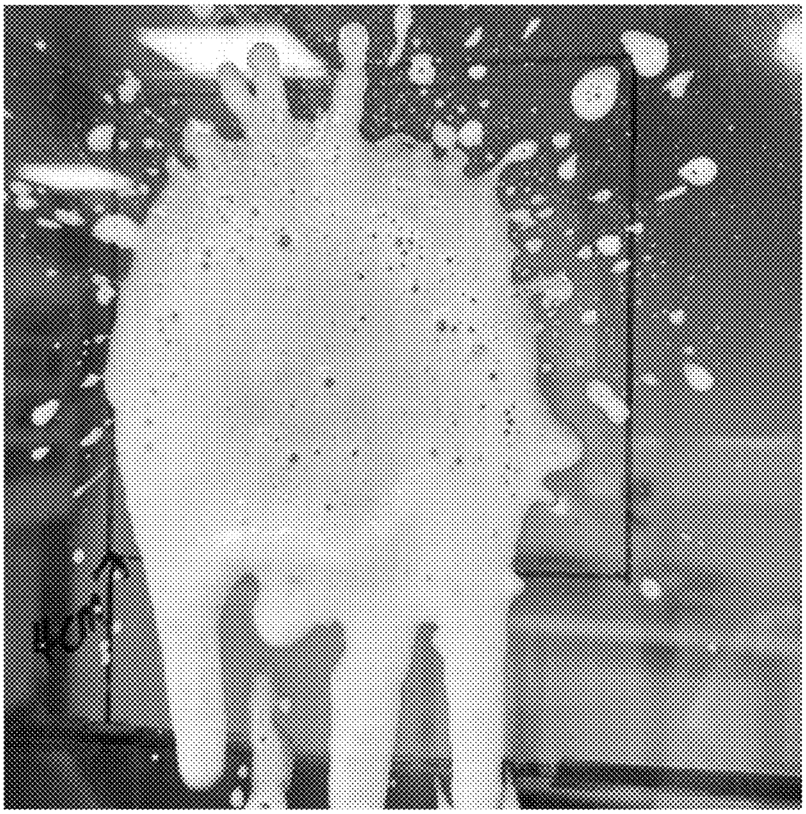
FIG. 3 is a picture of the state during the test 2) in Comparative example 1 of the present application.
Figure 4:
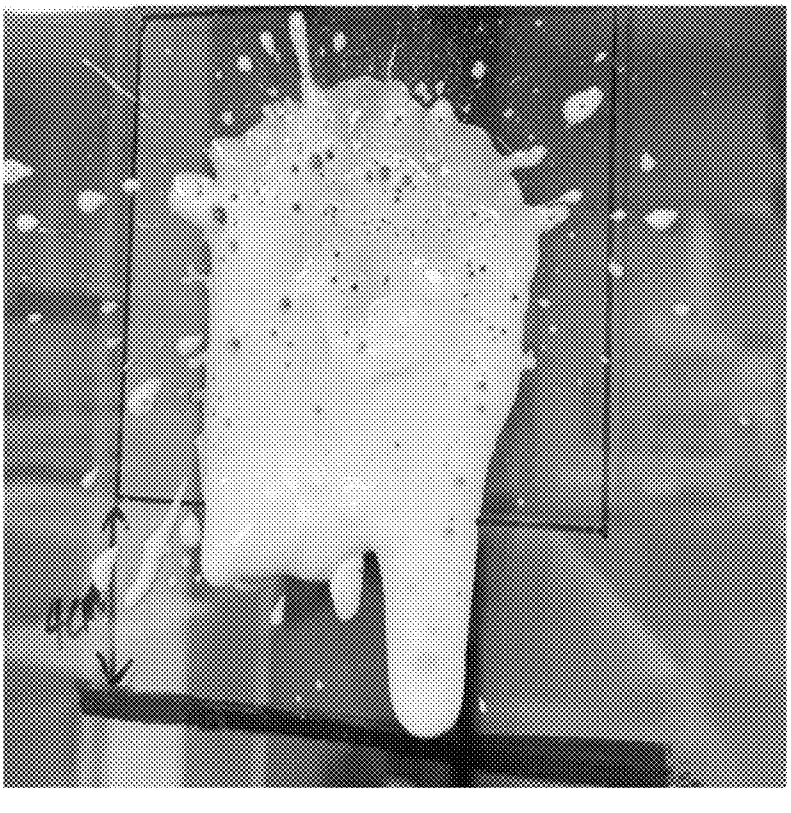
FIG. 4 is a picture of the state during the test 2) in Comparative example 2 of the present application.
Figure 5:
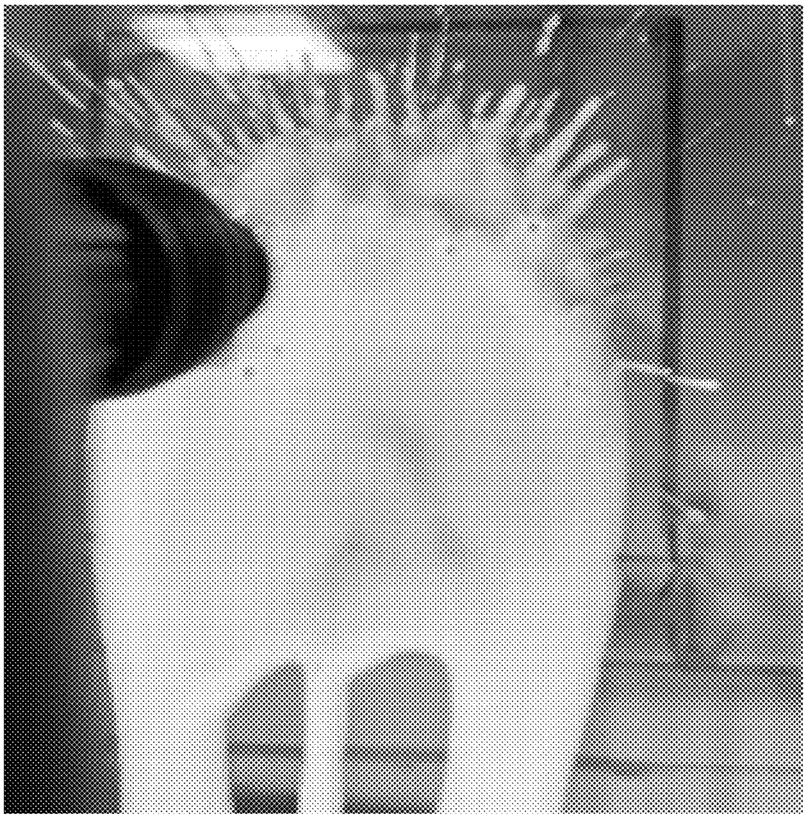
FIG. 5 is a picture of the state during the test 2) in Comparative example 5 of the present application.
Figure 6:
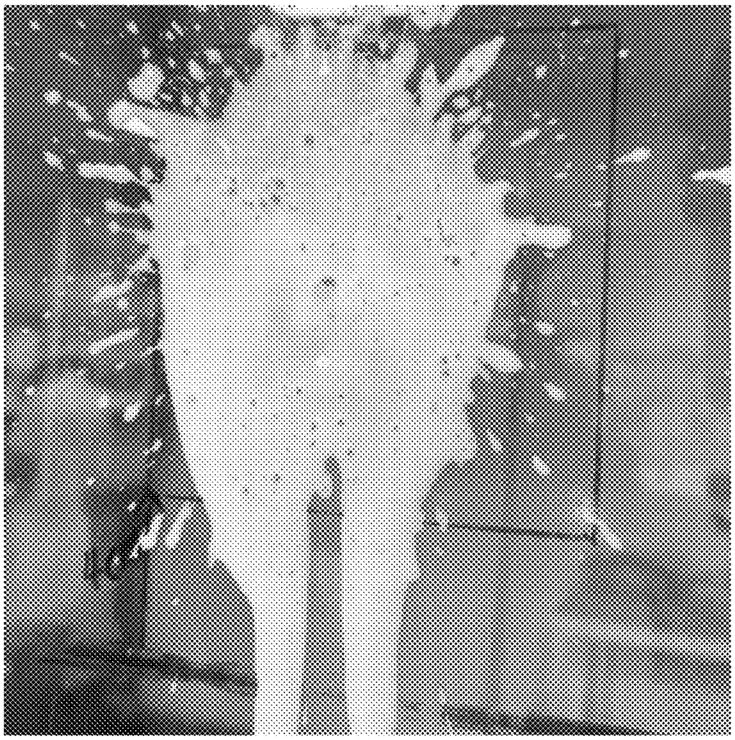
FIG. 6 is a picture of the state during the test 2) in Comparative example 6 of the present application.

FIG. 2 is a picture of the state during the test 2) in Example 3, FIG. 3 is a picture of the state during the test 2) in Comparative example 1, FIG. 4 is a picture of the state during the test 2) in Comparative example 2, FIG. 5 is a picture of the state during the test 2) in Comparative example 5 and FIG. 6 is a picture of the state during the test 2) in Comparative example 6.

3. Adhesion Property Test

The sheet of Example 3 was mixed with water in a ratio of 1:1000 to obtain the aqueous solution of Sample 1.

The sheet of Example 3 was mixed with water in a ratio of 1:500 to obtain the aqueous solution of Sample 2.

The sheet of Example 3 was mixed with water in a ratio of 1:250 to obtain the aqueous solution of Sample 3.

The above aqueous solutions were placed in the commercially available pressure spray cans and sprayed the cleaned vertical glass surfaces, which was observed and taken photos.

Figure 7:
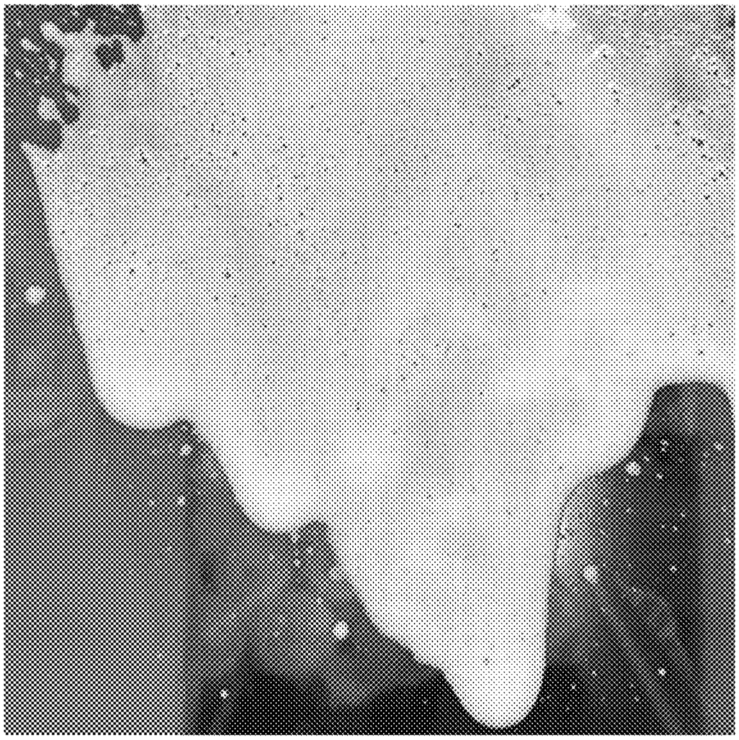
FIG. 7 is a test result figure of the aqueous solution of Sample 1 of the present application.
Figure 8:
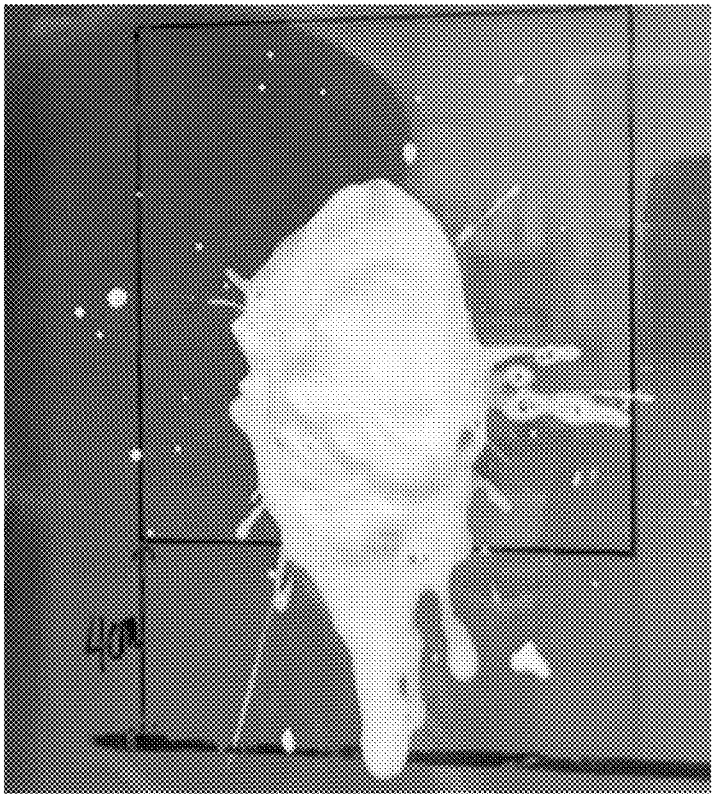
FIG. 8 is a test result figure of the aqueous solution of Sample 3 of the present application.

The test result of the aqueous solution of Sample 1 was shown in FIG. 7, the test result of the aqueous solution of Sample 2 was shown in FIG. 2, and the test result of the aqueous solution of Sample 3 was shown in FIG. 8.

Comparing FIGS. 2, and 7-8, the diluted water-soluble cleaning agent sheets were sprayed and adhered on the vertical and smooth surface well, and not easy to slip off immediately. The foam can be maintained in the area to be cleaned. As the diluted concentration was increased, the foam was getting denser and denser. Therefore, when it is used in daily life, the diluted concentration could be adjusted according to the polluted degree by stains, so that it can avoid waste, and is convenience and practical. In particular, the products are the solid sheets, may be packaged without plastics, are convenient for transportation and storage. When they are used again, the use of plastic spray bottles can be greatly reduced, thereby reducing waste and white pollution.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A water-soluble cleaning agent sheet, comprising the following components in parts by weight: 12-35 parts of film-forming agent, 0-3 parts of thickening agent, 0-10 parts of water softener, 15-50 parts of anionic surfactant, 1-10 parts of non-ionic surfactant, 1-10 parts of amphiprotic surfactant, 0-10 parts of solubilizer, 1-10 parts of acrylate polymer; 0-10 parts of plant extract, and 0-1 parts of preservative;

wherein the anionic surfactant is a mixture of dodecyl sulfate, alpha-olefin sulfonate, and disodium-C-(2-cocoylethyl) ester sulfo succinate;

the non-ionic surfactant is a mixture of alkyl glycoside and cocamide methyl monoethanolamine (MEA); and the amphiprotic surfactant is a mixture of N-(2-Aminoethyl)-N-(2-hydroxyethyl)-β-alanine-N-coconut oil derivative monosodium salt, disodium cocoyl amphoteric diacetate, and coconut fatty acid imidazoline dipropionate sodium salt.

2. The water-soluble cleaning agent sheet according to claim 1, wherein in the anionic surfactant, a mass ratio of the dodecyl sulfate, the alpha-olefin sulfonate, and the disodium-C-(2-cocoylethyl) ester sulfo succinate is (20-30):(3-8):(1-3); and in the non-ionic surfactant, a mass ratio of the alkyl glycoside to the cocamide methyl MEA is (1-3):(2-5).

3. The water-soluble cleaning agent sheet according to claim 1, wherein in the amphiprotic surfactant, a mass ratio of the oil derivative N-(2-Aminoethyl)-N-(2-hydroxyethyl)-β-alanine-N-coconut monosodium salt, the disodium cocoyl amphoteric diacetate, and the coconut fatty acid imidazoline dipropionate sodium salt is (1-3):(1-3):(0.1-2).

4. The water-soluble cleaning agent sheet according to claim 1, wherein the acrylate polymer is 2-6 parts in parts by weight.

5. The water-soluble cleaning agent sheet according to claim 1, wherein the film-forming agent is one or more selected from the group consisting of polyvinyl alcohol and polyvinyl alcohol crosspolymer.

6. The water-soluble cleaning agent sheet according to claim 1, wherein the solubilizer is one or more selected from the group consisting of alcohol solubilizer and ether solubilizer.

7. The water-soluble cleaning agent sheet according to claim 1, wherein the plant extract is one or more selected from the group consisting of soapberry extract and *Camellia oleifera* Abel extract.

8. The water-soluble cleaning agent sheet according to claim 1, wherein a mass ratio of the film-forming agent to the thickening agent is (20-26):(0.5-1.5).

9. The water-soluble cleaning agent sheet according to claim 1, wherein the thickening agent is one or more selected from the group consisting of water-soluble polymer adhesive and cellulose.

10. The water-soluble cleaning agent sheet according to claim 9, wherein the water-soluble polymer adhesive is one or more selected from the group consisting of xanthan gum, Arabic gum, guar gum, and locust bean gum.

11. The water-soluble cleaning agent sheet according to claim 9, wherein the cellulose is one or more selected from the group consisting of carboxymethyl cellulose, hydroxypropyl methyl cellulose, hydroxyethyl cellulose, and polyanionic cellulose.

12. The water-soluble cleaning agent sheet according to claim 6, wherein the alcohol solubilizer is one or more selected from the group consisting of ethanol, ethylene glycol, glycerol, propylene glycol, dipropylene glycol, isopropanol, pentanediol, butanediol, and isohexanediol.

13. The water-soluble cleaning agent sheet according to claim 6, wherein the ether solubilizer is one or more selected from the group consisting of ether, n-ether, dimethyl ether, ethylene glycol ether, and dipropylene glycol ether.

14. The water-soluble cleaning agent sheet according to claim 7, wherein the plant extract is a mixture of the soapberry extract and the *Camellia oleifera* Abel extract with a mass ratio of 1:(0.8-1.2).

15. The water-soluble cleaning agent sheet according to claim 1, wherein the water softener is a mixture of sodium citrate and one or more selected from the group consisting of trisodium methylglycine diacetate, tetrasodium ethylenediaminetetraacetate, sodium gluconate, dicarboxymethylalanine trisodium, and dicarboxymethylaspartate tetrasodium.

16. The water-soluble cleaning agent sheet according to claim 1, wherein the preservative is one or more selected from the group consisting of hydroxydichlorodiphenyl ether, dichlorobenzyl alcohol, methyl hydroxybenzoate, and hydroxyphenyl acetate.

17. A water-soluble cleaning agent sheet, comprising the following components in parts by weight: 12-35 parts of film-forming agent, 0-3 parts of thickening agent, 0-10 parts of water softener, 15-50 parts of anionic surfactant, 1-10 parts of non-ionic surfactant, 1-10 parts of amphiprotic surfactant, 0-10 parts of solubilizer, 1-10 parts of acrylate polymer; 0-10 parts of plant extract, and 0-1 parts of preservative;

wherein the anionic surfactant is one or more selected from the group consisting of alpha-olefin sulfonate, dodecylbenzene sulfonate, disodium-C-(2-cocoylethyl) ester sulfo succinate, and dodecyl sulfate;

the non-ionic surfactant is one or more selected from the group consisting of alkyl glycoside, maltoside, coconut oil fatty acid diethanolamide, and cocamide methyl monoethanolamine (MEA);

the amphiprotic surfactant is one or more selected from the group consisting of N-(2-Aminoethyl)-N-(2-hydroxyethyl)-β-alanine-N-coconut oil derivative monosodium salt, cocoylaminopropyl betaine, dodecyldimethylamine oxide, disodium cocoyl amphoteric diacetate, and coconut fatty acid imidazoline dipropionate sodium salt;

in the anionic surfactant, a mass ratio of the dodecyl sulfate, the alpha-olefin sulfonate, and the disodium-C-(2-cocoylethyl) ester sulfo succinate is (20-30):(3-8):(1-3); and in the non-ionic surfactant, a mass ratio of the alkyl glycoside to the cocamide methyl MEA is (1-3):(2-5).

18. A water-soluble cleaning agent sheet, comprising the following components in parts by weight: 12-35 parts of film-forming agent, 0-3 parts of thickening agent, 0-10 parts of water softener, 15-50 parts of anionic surfactant, 1-10 parts of non-ionic surfactant, 1-10 parts of amphiprotic surfactant, 0-10 parts of solubilizer, 1-10 parts of acrylate polymer; 0-10 parts of plant extract, and 0-1 parts of preservative;

wherein the anionic surfactant is one or more selected from the group consisting of alpha-olefin sulfonate, dodecylbenzene sulfonate, disodium-C-(2-cocoylethyl) ester sulfo succinate, and dodecyl sulfate;

the non-ionic surfactant is one or more selected from the group consisting of alkyl glycoside, maltoside, coconut oil fatty acid diethanolamide, and cocamide methyl monoethanolamine (MEA);

the amphiprotic surfactant is one or more selected from the group consisting of N-(2-Aminoethyl)-N-(2-hydroxyethyl)-β-alanine-N-coconut oil derivative monosodium salt, cocoylaminopropyl betaine, dodecyldimethylamine oxide, disodium cocoyl amphoteric diacetate, and coconut fatty acid imidazoline dipropionate sodium salt; and in the amphiprotic surfactant, a mass ratio of the N-(2-Aminoethyl)-N-(2-hydroxyethyl)-β-alanine-N-coconut oil derivative monosodium salt, the disodium cocoyl amphoteric diacetate, and the coconut fatty acid imidazoline dipropionate sodium salt is (1-3):(1-3):(0.1-2).

* * * * *